(12) United States Patent
Visco et al.

(10) Patent No.: US 7,553,573 B2
(45) Date of Patent: Jun. 30, 2009

(54) SOLID STATE ELECTROCHEMICAL COMPOSITE

(75) Inventors: Steven J. Visco, Berkeley, CA (US); Craig P. Jacobson, Moraga, CA (US); Lutgard C. DeJonghe, Lafayette, CA (US)

(73) Assignee: The Regents of The University of California

(*) Notice: Subject to any disclaimer, the term of this patent is extended or adjusted under 35 U.S.C. 154(b) by 218 days.

(21) Appl. No.: 11/042,788

(22) Filed: Jan. 24, 2005

(65) Prior Publication Data
US 2005/0214612 A1    Sep. 29, 2005

Related U.S. Application Data

(60) Continuation-in-part of application No. 10/724,558, filed on Nov. 26, 2003, now Pat. No. 6,846,511, which is a division of application No. 09/626,022, filed on Jul. 27, 2000, now Pat. No. 6,682,842.

(60) Provisional application No. 60/146,767, filed on Jul. 31, 1999.

(51) Int. Cl.
*H01M 8/10* (2006.01)
(52) U.S. Cl. ............... 429/30; 429/40; 429/44
(58) Field of Classification Search ............ 429/16, 429/41, 30
See application file for complete search history.

(56) References Cited

U.S. PATENT DOCUMENTS

| | | |
|---|---|---|
| 4,720,335 A | 1/1988 | Fukushima et al. |
| 5,240,480 A | 8/1993 | Thorogood et al. |
| 5,306,411 A | 4/1994 | Mazanec et al. |
| 5,328,779 A | 7/1994 | Tannenberger et al. |
| 5,366,770 A | 11/1994 | Wang |
| 5,589,285 A | 12/1996 | Cable et al. |
| 5,670,270 A | 9/1997 | Wallin |
| 5,932,368 A | 8/1999 | Batawi et al. |
| 5,938,822 A | 8/1999 | Chen et al. |
| 5,993,986 A | 11/1999 | Wallin et al. |
| 6,017,647 A * | 1/2000 | Wallin .................. 429/33 |

(Continued)

FOREIGN PATENT DOCUMENTS

GB    1 383 343 A    2/1974

(Continued)

OTHER PUBLICATIONS

Seabaugh, et al., "Low-Cost Fabrication Processes for Solid Oxide Fuel Cells", NexTech exhibited at Fuel Cells 2000 Conference in Portland, NexTech Materials Ltd., (Oct. 30, 2000-Nov. 2, 2000).

(Continued)

*Primary Examiner*—Patrick Ryan
*Assistant Examiner*—Ben Lewis
(74) *Attorney, Agent, or Firm*—Weaver Austin Villeneuve & Sampson LLP

(57) ABSTRACT

Provided is a composite electrochemical device fabricated from highly electronically conductive materials such as metals, metal alloys, or electronically conductive ceramics. The electronic conductivity of the electrode substrate is maximized. The invention allows for an electrode with high electronic conductivity and sufficient catalytic activity to achieve high power density in ionic (electrochemical) devices such as fuel cells and electrolytic gas separation systems including oxygen generation system.

14 Claims, 5 Drawing Sheets

U.S. PATENT DOCUMENTS

| | | | |
|---|---|---|---|
| 6,344,291 | B1 | 2/2002 | Hitomi |
| 6,358,567 | B2 | 3/2002 | Pham et al. |
| 6,368,383 | B1 | 4/2002 | Virkar et al. |
| 6,420,064 | B1 | 7/2002 | Ghosh et al. |
| 6,576,363 | B1 | 6/2003 | Hitomi |
| 6,682,842 | B1 | 1/2004 | Visco et al. |
| 6,783,880 | B2 | 8/2004 | Christiansen |
| 2002/0048699 | A1 | 4/2002 | Steele et al. |
| 2002/0177031 | A1* | 11/2002 | Doshi et al. .............. 429/44 |

FOREIGN PATENT DOCUMENTS

| | | |
|---|---|---|
| JP | 56002549 A | 1/1981 |
| JP | 407006768 A | 1/1995 |
| WO | 97 00734 A | 1/1997 |

OTHER PUBLICATIONS

Fujii, K., et al., "Manufacturing and Characterization of Metallic System System Support Tube for Solid Oxide Fuel Cells", Bulletin of the Electrotechnical Laboratory, vol. 62, No. 1-2, pp. 13-19, (1998).

Momma, et al., "High Potential Performance of Tubular Type SOFC using Metallic System Components", Electrochemical Proceedings, vol. 97-18, pp. 311-320, (Jun. 1997).

Schiller, G., et al., "Development of Metallic Substrate Supported Thin-Film SOFC by Applying Plasma Spray Techniques", Electrochemical Society Proceedings, vol. 99-19, pp. 893-903, (Oct. 1999).

Okuo, et al., "Improvement in Power Stability and Durability Demonstration on New Tubular Type SOFC using Metallic System Component", Bulletin of the Electrotechnical Laboratory, vol. 60, No. 5, pp. 1-9, (1996).

Schiller, G., et al., "Development of Plasma Sprayed Components for a New SOFC Design", Electrochemical Proceedings, vol. 97-18, pp. 635-644, (1997).

Schiller, G., et al., "Development of SOFC Components by Vacuum Plasma Spraying", 1998 Fuel Cell Seminar Abstracts, Palm Springs, CA, pp. 515-518, (Nov. 16-19, 1998).

Takenoiri, et al., "Development of Metallic Substrate Supported Planar SOFC at Fuji Electric", 1998 Fuel Cell Seminar Abstracts, Palm Springs, CA, pp. 84-87, (Nov. 16-19, 1998).

Unal, et al., "Microstrutures of Y2O3-Stabilized ZrO2 Electron Beam-Physicial Vapor Deposition Coatings on Ni-Base Superalloys", Journal of the American Ceramic Society, vol. 77, No. 4, pp. 984-992, (1994).

Wallin, et al., "Cofired Solid Oxide Fuel Cells for Operation at 800oC", Proc. Electrochem. Soc., vol. 97-13, (1997).

Yao, et al., "Improved Preparation Procedure and Properties for a Multilayer Piezoelectric Thick-Film Actuator", Sensors and Acutators A, vol. 71, pp. 139-143, (May 1, 1998).

Okuo, et al., "Development of Metallic Substrate Tubular SOFC", Bulletin of the Electrotechnical Laboratory, vol. 58, pp. 909-918, (Oct. 1994).

* cited by examiner

SOLID STATE ELECTROCHEMICAL COMPOSITE

CROSS-REFERENCE TO RELATED APPLICATIONS

This application is a continuation-in-part and claims priority from U.S. Ser. No. 10/724,558, filed Nov. 26, 2003, now U.S. Pat. No. 6,846,511, which is divisional of U.S. Ser. No. 09/626,022, filed Jul. 27, 2000, now U.S. Pat. No. 6,682,842, which claims priority from U.S. Provisional Application No. 60/146,767, entitled SURFACE ADDITIVES FOR ENHANCED ELECTRODE PERFORMANCE, filed Jul. 31, 1999, the disclosures of which are all herein incorporated by reference for all purposes.

STATEMENT OF GOVERNMENT SUPPORT

This invention was made with government support in the course of or under prime contract No. DE-ACO3-76SF00098 between the U.S. Department of Energy and the University of California. The government has certain rights in this invention.

BACKGROUND OF THE INVENTION

The present invention relates generally to the field of electrochemical devices, and more particularly solid state electrochemical devices composed of one or more electrodes in contact with a solid state electrolyte and/or membrane.

Solid state electrochemical devices are often implemented as cells including two electrodes, the anode and the cathode, and a dense solid electrolyte/membrane which separates the electrodes. In many implementations, such as in fuel cells and oxygen and syn gas generators, the solid membrane is an electrolyte composed of a material capable of conducting ionic species, such as oxygen ions, sodium ions, or hydrogen ions, yet has a low electronic conductivity. In other implementations, such as gas separation devices, the solid membrane is composed of a mixed ionic electronic conducting material ("MIEC"). In each case, the electrolyte/membrane must be gas-tight to the electrochemical reactants. In all of these devices a lower total internal resistance of the cell results in improved performance.

The preparation of solid state electrochemical cells is well known. For example, a typical solid oxide fuel cell is composed of a dense electrolyte membrane of a ceramic oxygen ion conductor, a porous anode layer of a ceramic, a metal or, most commonly, a ceramic-metal composite ("cermet"), in contact with the electrolyte membrane on the fuel side of the cell, and a porous cathode layer of an ionically/electronically-conductive metal oxide on the oxidant side of the cell. Electricity is generated through the electrochemical reaction between a fuel (typically hydrogen produced from reformed methane) and an oxidant (typically air). This net electrochemical reaction involves mass transfer and charge transfer steps that occur at the interface between the ionically-conductive electrolyte membrane, the electronically-conductive electrode and the vapor phase (fuel or oxygen). The contribution of these charge transfer steps, in particular the charge transfer occurring at the oxygen electrode, to the total internal resistance of a solid oxide fuel cell device can be significant.

Electrode structures including a porous layer of electrolyte particles on a dense electrolyte membrane with electrocatalyst material on and within the porous layer of electrolyte are known. As shown in FIG. 1, such electrodes are generally prepared by applying an electrocatalyst precursor-containing electrode material 102 (such as a metal oxide powder having high catalytic activity and high reactivity with the electrolyte) as a slurry to a porous (pre-fired; unsintered; also referred to as "green") electrolyte structure 104, and then co-firing the electrode and electrolyte materials to densify the electrolyte and form a composite electrolyte/electrode/electrocatalyst 106.

Oxides containing transition metals such as Co, Fe, Mn, are known to be useful as oxygen electrodes in electrochemical devices such as fuel cells, sensors, and oxygen separation devices. However, if such compounds were to be used with typical zirconia-based electrolytes, such as YSZ, a deleterious reaction in the temperature range of 1000-1400° C. typically needed to densify zirconia would be expected. The product of this reaction would be a resistive film 105 at the electrode/electrolyte interface, thereby increasing the cell's internal resistance.

Similar problems may be encountered with sintering highly catalytic electrode materials on densified (fired) zirconia-base electrolytes since the sintering temperatures of about 1200° C. to 1400° C. are sufficient to cause the formation of a deleterious resistive film at the electrode/electrolyte interface.

In order to avoid deleterious chemical reactions, attempts have been made to use barrier layers, such as ceria, or to use chemically compatible electrolytes, such as ceria with such transition metal oxides. Also, it has been proposed to add an electrolcatalytic precursor to a fired electrode/electrolyte composite, but only for a specific type of electrode material. Specifically, prior researchers have sought to fabricate electrodes with interpenetrating networks of ionically conductive and electronically conductive materials with subsequent infiltration of a catalytic electrode. However, this can hinder the performance of ionic devices, particularly at high current densities where ohmic drop due to current collection can lead to substantial efficiency losses.

SUMMARY OF THE INVENTION

Devices suitable for oxygen separation or applications such as partial oxidation reactors or oxidative reformers may utilize dense membranes of mixed ionic electronic conductors (MIEC) or pure ionic conductors. In the case of a MIEC membrane the oxygen transport is driven a chemical potential gradient resulting from pressurization (for example air) or from supplying a hydrocarbon (such as methane) to one side of the membrane. No external current or voltage is needed and electrons do not flow through an external circuit. In the case of a pure ionic conducting membrane current will be generated (in an oxidative reformers or a fuel cell) or must be supplied (electrolytic oxygen generation) and the electrode and/or support structure must remove or supply electrons for operation. In prior art dense MIEC membranes in contact with porous MIEC electrodes have been fabricated. In these devices no current was supplied. In one embodiment the device according to the present invention uses a composite material having at least a three layer structure employing a porous electronic conductive layer/porous ionic conductive layer/dense ionic conductive layer. In one embodiment a catalytic material (electrocatalyst) is added to the structure by infiltration of a metal salt and subsequent low temperature firing. The catalytic material is in electrical contact with the porous electronic conductive layer and the porous ionic conductive layer.

In one embodiment of the present invention there is disclosed a composite structure, comprising a porous electronic conductive layer, a porous ionic conductive layer comprising an electrocatalyst, wherein the porous ionic conductive layer is on top of the porous electronic conductive layer, and a dense ionic conductive layer overlying the porous ionic conductive layer, and an electrode overlying the dense ionic conductive layer, wherein the electrocatalyst is in electrical contact with the layer above and below the porous ionic conductive layer. In another embodiment the electrode comprises a porous electronic conductive layer. In another embodiment the electrode comprises a porous ionic conductive layer having a porous electronic conductive layer thereon, thus creating a five layer structure. In yet another embodiment the electrode comprises a porous mixed ionic/electronic conductive layer. In one embodiment the porous electronic conductive layer is between 50 and 2000 microns thick, and the porous ionic conductive layer is between 1 and 100 microns thick, and the dense ionic conductive layer is between 1 and 100 microns thick. Preferably the porous electronic conductive layer is between 50 and 2000 microns thick, and the porous ionic conductive layer is between 5 and 30 microns thick, and the dense ionic conductive layer is between 5 and 30 microns thick. In a preferred embodiment, the porous electronic conductive layer consists essentially of an electronic conductor, and the porous ionic conductive layer and the dense ionic conductive layer consists essentially of an ionic conductor material. Preferably, the porous electronic conductive layer comprises a metal or a metal alloy. More preferably, the porous electronic conductive layer comprises an alloy selected from the group consisting of a low chromium ferritic steel, an intermediate-chromium ferritic steel, a high-chromium ferritic steel, a chrome-based alloy and a nickel-based Inconel alloy. Even more preferably, the porous electronic conductive layer comprises Cr metal. Preferably, the porous ionic conductive layer comprises a material selected from the group consisting of doped zirconia, doped ceria, scandia stabilized zirconia (SSZ), yttria stabilized zirconia (YSZ), doped lanthanum gallate and doped bismuth oxide. More preferably, the porous ionically conductive layer comprises YSZ. Preferably the composite structure of the present invention is part of a solid oxide fuel cell or a gas generation or separation device, preferably an oxygen separation or generation device.

In one embodiment the present invention provides an electrode fabricated from highly electronically conductive materials such as metals, metal alloys, or electronically conductive ceramics. In this way, the electronic conductivity of the electrode substrate is maximized. Onto this electrode in the green state, a green ionic (e.g., electrolyte) film may be deposited and the assembly is co-fired at a temperature suitable to fully densify the film while the substrate retains porosity. In one embodiment a second green ionic (e.g., electrolyte) layer is deposited between the electrode and the assembly co-fired at a temperature to fully densify the film while the substrate and the second ionic layer retain porosity. Subsequently, a catalytic material is added to the electrode structure by infiltration of a metal salt and subsequent low temperature firing. The invention allows for an electrode with high electronic conductivity and sufficient catalytic activity to achieve high power density in an ionic (electrochemical) device such as fuel cells and electrolytic gas separation systems.

In one aspect, the present invention provides a method of preparing a layered composite electrode/electrolyte structure having a porous electrode in contact with a dense electrolyte membrane, with or without a porous ionic conducting layer between the porous electrode and the dense electrolyte membrane. The method involves contacting a mixture of particles of an electronically-conductive or a homogeneous mixed ionically electronically-conductive (MIEC) electrode material with a layer of an ionically-conductive electrolyte material to form an assembly having a layer of the mixture on at least one side of the layer of the electrolyte material. The assembly is sintered, and the sintered assembly is then infiltrated with a solution or dispersion of an electrocatalyst precursor.

In another aspect, the invention provides a solid state electrochemical composite electrode/electrolyte structure for a solid state electrochemical device having a porous electrode in contact with a dense electrolyte membrane.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawing.

DETAILED DESCRIPTION OF THE INVENTION

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention. In general, the present invention provides a technique for the addition of highly reactive elements known to be of value for enhancing catalytic properties of the electrode to the surface where they are needed, without chemical reactions that occur during firing on of these electrode materials. In this way, moderate performance electrodes that are known to be more chemically stable at the firing temperatures can be used for the electrode's microstructure formation. Then high performance additives can be incorporated into the electrodes without significantly altering the microstructure or creating performance limiting reaction layers.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs. It is understood that "conductive" and "conductor" are used interchangeably herein.

For the purposes of this application, an oxygen (or air) electrode refers to the electrode at which oxygen is either reduced, or oxygen anions are oxidized, depending on the function of the cell. Examples of oxygen electrodes are the cathode portion of a solid oxide fuel cell or the anode portion of an electrolytic cell, such as may be used for oxygen generation.

When used herein, "dense ionic conductive layer" means a layer comprising a material capable of ionic conduction. When used herein, "porous ionic conductive layer" means a layer comprising a material capable of ionic conduction. When used herein "porous electronic conductive layer" means a layer comprising a material capable of electronic conduction. It is understood that in some embodiments the layers may not be restricted to those materials, but may also include other materials.

Figure 1:
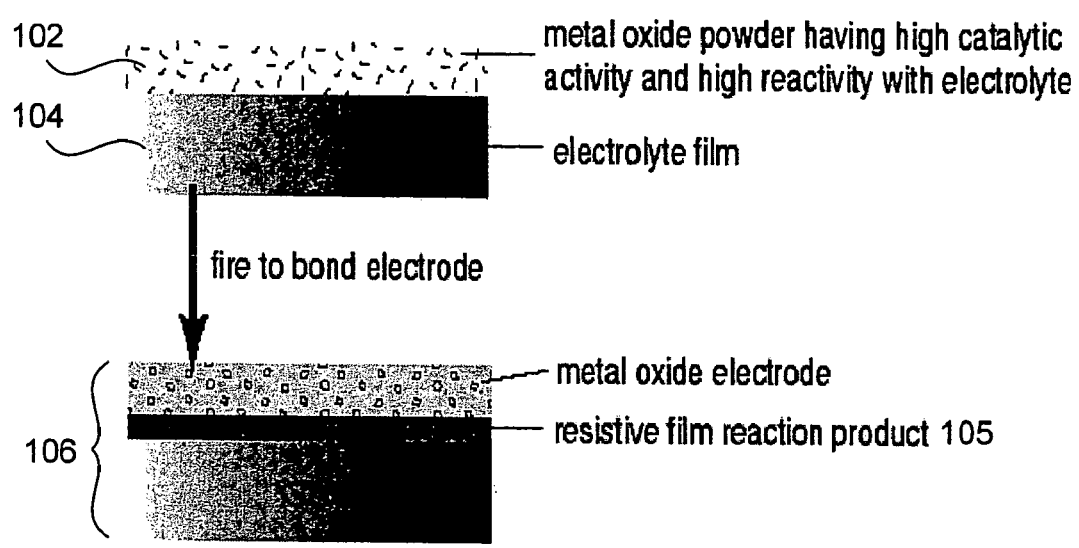
FIG. 1 depicts an undesirable prior art method of forming an electrode/electrolyte composite for a solid sate electrochemical cell.
Figure 2:
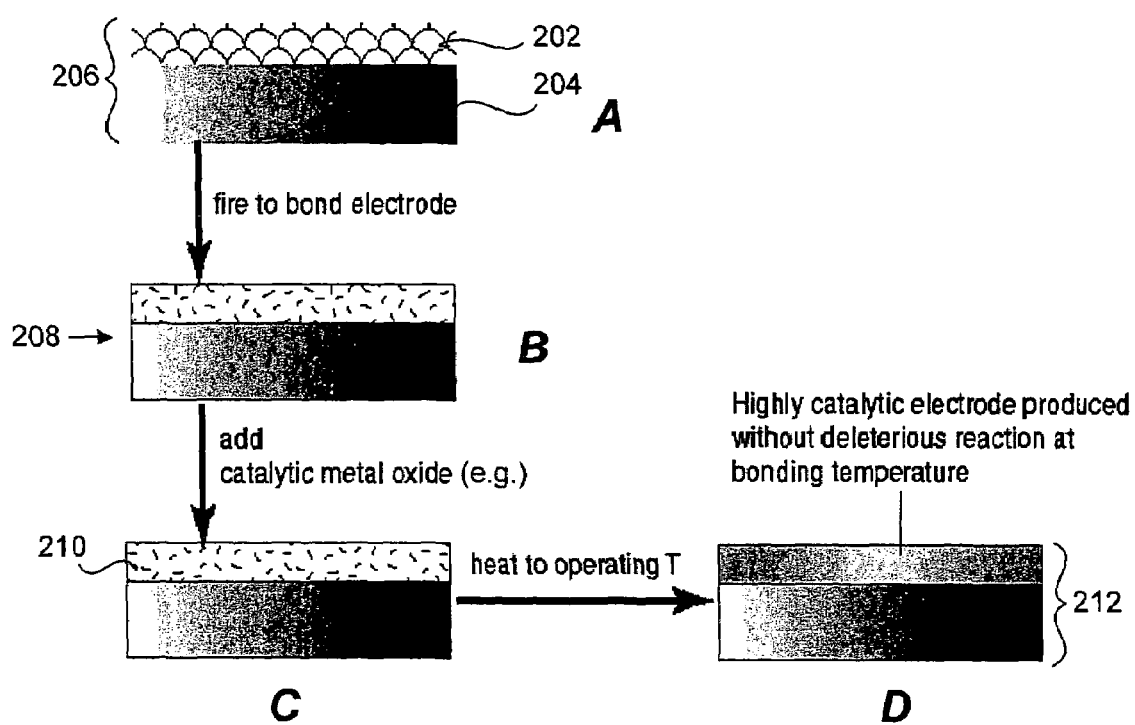
FIGS. 2A-D depict stages in a method of forming an electrode/electrolyte composite for a solid state electrochemical cell in accordance with one embodiment the present invention.
Figure 3:
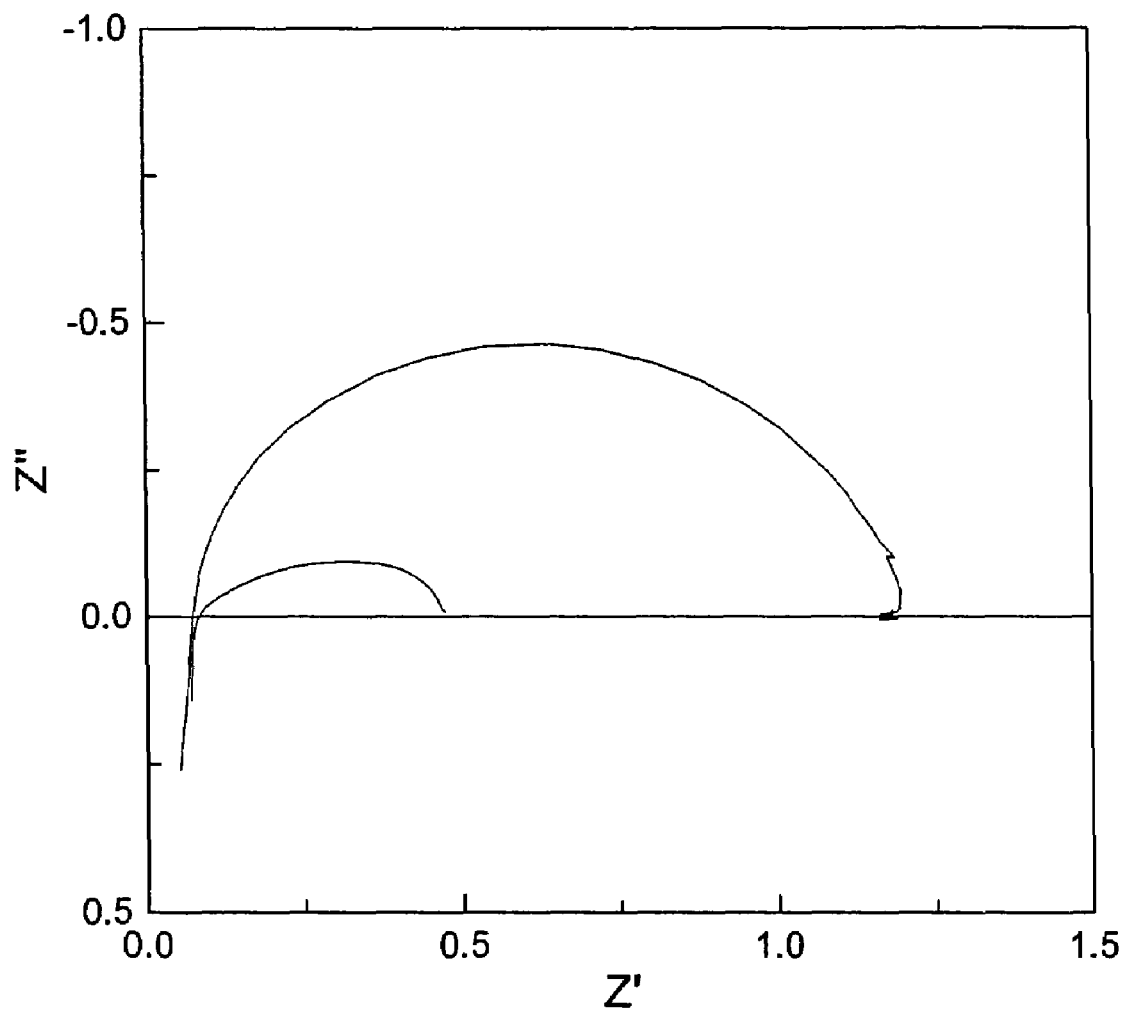
FIG. 3 shows plots of the impedance spectra for an electrode with and without additives in accordance with one embodiment of the present invention.

FIGS. 2A-D show stages in a method of forming an electrode/electrolyte composite for a solid state electrochemical cell in accordance with one embodiment the present invention. Referring to FIG. 2A, a particulate electrode material 202 is applied as a slurry to a porous green (pre-fired; unsintered) electrolyte structure 204 to form an assembly 206.

The electrode/electrolyte structure of the invention may be prepared by any suitable method. For example, an unsintered (possibly bisque fired) moderately catalytic electronically-conductive or homogeneous mixed ionic electronic conductive electrode material may be deposited on a layer composed of a sintered or unsintered ionically-conductive electrolyte material prior to being sintered. In one embodiment, a layer of particulate electrode material is deposited on an unsintered layer of electrolyte material and the electrode and electrolyte layers are sintered simultaneously, sometimes referred to as "co-firing." In another embodiment, the layer of particulate electrode material is deposited on a previously sintered layer of electrolyte, and then sintered. The particulate electrode material may be applied to the electrolyte layer (generally composed of particles of an electrolyte material), by any suitable means such as, for example, aerosol spray, dip coating, painting or silk-screening, electrophoretic deposition, vapor deposition, vacuum infiltration, and tape casting.

In general, suitable electrode materials in accordance with the present invention as have an electronic conductivity of at least about $10^{-1}$ Siemens/cm (S/cm) at the operating temperature of the electrochemical device with which the electrode is to be incorporated. Preferably, the conductivity of the material is at least about 100 S/cm, more preferably at least about 1000 S/cm. The electrode material should also be compatible with the electrolyte layer; that is, it should not cause any deleterious reaction with the electrolyte at the processing temperatures to form a new phase with insufficient conductivity or electrocatalytic properties for use in a practical electrochemical device.

By "electrical contact" it is meant that the at least some of the electrocatalyst is in intimate, physical contact with the layer above and below.

It is understood that the electrocatalyst may comprise either an electronic conductor or a mixed ionic and electronic conductor. Electrocatalysts are known in the art and one of ordinary skill will be able to choose a suitable catalyst for the intended reaction that one wishes to catalyze. Examples include perovskites and metals such as Co, Ni and Fe.

Exemplary electronically-conductive materials include metals, such as the transition metals Cr, Fe, Cu, Ag, and metal alloys thereof. Such metal electrode materials are suitable for use in oxygen or hydrogen electrodes for solid state electrochemical devices that are operated at relatively low temperatures, for example, about 400 to 800° C.

In one embodiment of the present invention there is contemplated a composite structure, comprising a porous electronic conductive layer, a porous ionic conductive layer comprising an electrocatalyst, wherein the porous ionic conductive layer is on top of the porous electronic conductive layer, and a dense ionic conductive layer overlying the porous ionic conductive layer, wherein the electrocatalyst is in electrical contact with the layer above and below the porous ionic conductive layer. In one preferred embodiment of the present invention there is disclosed an electrode on top of the dense ionic conductive layer. It is understood that one of the layers may consist of multiple layers each, for example the composite may actually have two, three or more porous ionic conductive layers, each on top of one another and having different porosities to establish a gradient of porosities.

The porosity of the porous electronic conductive layers disclosed herein ranges in pore sizes from about 1 micron to 100 microns. The pore size of the porous ionic conductive layer ranges in pore sizes between about 0.1 micron and 10 microns.

U.S. Pat. No. 5,589,285 discloses suitable materials for electronic conductors, ionic conductors and mixed ionic/electronic conductors (MIEC), and the contents therein are hereby incorporated by reference in its entirety.

The invention contemplates that there is an electrode overlying the dense ionic conductive layer. Preferably the electrode is porous. In one embodiment this electrode comprises a porous electronic conductive layer. In another embodiment the electrode comprises a composite of a porous ionic conductive layer and a porous electronic conductive layer thereon. In yet another embodiment the electrode comprises a mixed ionic/electronic conductive layer.

Other suitable electrode materials include mixed ionic electronic conductor ceramic materials, such as $La_{1-x}Sr_xMn_yO_{3-\delta}$ ($1 \geq X \geq 0.05$) ($0.95 \leq y \leq 1.15$) ("LSM"), $La_{1-x}Sr_xCoO_{3-\delta}$ ($1 \geq X \geq 0.10$) ("LSC"), $SrCo_{1-x}Fe_xO_{3-\delta}$ ($0.30 \geq X \geq 0.20$), $La_{0.6}Sr_{0.4}Co_{0.6}Fe_{0.4}O_{3-\delta}$, $Sr_{0.7}Ce_{0.3}MnO_{3-\delta}$, $LaNi_{0.6}Fe_{0.4}O_3$, and $Sm_{0.5}Sr_{0.5}CoO_3$. Preferred LSM materials include $La_{0.8}Sr_{0.2}MnO_{3-\delta}$, $La_{0.65}Sr_{0.30}MnO_{3-\delta}$, $La_{0.45}Sr_{0.55}MnO_{3-\delta}$. These materials form a homogeneous electrode having both ionic and electronic conductivity.

Low-chromium ferritic steels, such as type 405 and 409 (11-15% Cr), intermediate-chromium ferritic steels, such as type 430 and 434, (16-18% Cr), or high-chromium ferritic steels, such as type 442, 446 and E-Brite (19-30% Cr), chrome based alloys such as Cr5Fe1Y, and nickel-based Inconel alloys including Inconel 600 may also be used as an electrode material.

Suitable electrolyte/membrane materials for use in solid state electrochemical devices are well known in the art. In general, they are ionically-conductive solid membranes having an ionic conductivity of at least about $10^{-3}$ S/cm at the operating temperature of the device and sufficiently low electronic conductivity for use as the electrolyte membrane which separates the anode from the cathode in a solid state electrochemical device. Doped zirconias such as yttria-stabilized zirconia ("YSZ") and scandium-doped zirconia are very commonly used. Preferably, the porous ionic conductive layer comprises YSZ.

In the case of an electrolytic oxygen separation device, where oxygen is driven across the membrane by applying a potential difference and supplying energy, the porous ionic conductive layer material may be chosen from electrolytes well known in the art including yttria stabilized zirconia (e.g., $(ZrO_2)_{0.92}(Y_2O_3)_{0.08}$), scandia stabilized zirconia (SSZ), doped ceria such as $(CeO_2)_{0.8}(Gd_2O_3)_{0.2}$ (CGO), doped lanthanum gallate such as $La_{0.8}Sr_{0.2}Ga_{0.85}Mg_{0.15}O_{2.825}$ (LSGM20-15) and doped bismuth oxide such as $(Bi_2O_3)_{0.75}(Y_2O_3)_{0.25}$.

Composites according to the present invention may be prepared by any suitable method, such as by depositing a slurry of an ionically-conductive electrolyte material directly onto one of the electrodes, or by preparing a cast tape of an ionically-conductive electrolyte material, which is laminated to a cast tape of electrode material. Electrolyte membranes or layers disclosed herein may comprise either a porous ionic conductive layer or a dense ionic conductive layer, or multiple layers of each to establish a gradient in porosities. A suitable gradient may include three layers of a porous ionic conductive layer with the porosity changing by about 10, 20, 30 or 40 percent in each layer. The change of porosity in the gradient does not have to be linear. The first layer may have a certain porosity. The second layer in the gradient may have a porosity of 10, 15, 20, 30, 40, 50, 60 or 70 percent of the first layers porosity, and the third and subsequent layer may have the same change in percent as the first layer.

The assembly 206 is then fired at a temperature and under conditions suitable to sinter the electrode material, densify the electrolyte (where necessary), and bond the two to form a composite electrolyte/electrode 208, as shown in FIG. 2B. The sintering conditions should be selected so that they are sufficient to fuse the majority of the electrode particles. If the electrolyte is green, the sintering conditions should be selected to densify the electrolyte material sufficiently to form a gas-tight electrolyte membrane. Suitable sintering conditions for given materials may be readily determined experimentally by those of skill in the art. When sintered, the electrode material forms a porous layer.

As shown in FIG. 2C, an electrocatalytic precursor is then is incorporated into the porous sintered electrode 210. The electrocatalytic precursor is added by any suitable technique, such as by infiltrating the network with a solution or dispersion of an electrocatalyst precursor and heating the infiltrated network under conditions sufficient to form the corresponding electrocatalyst. The electrocatalyst should have sufficient catalytic activity for the electrochemical reaction(s) occurring at the electrode for its use in a practical device. This material must also be compatible with the electrolyte layer at the operating temperature of the device.

Suitable electrocatalytic precursors in accordance with the present invention include aqueous or non-aqueous solutions of metal salts, such as nitrates, acetates and citrates. For example, this can be accomplished by using nitrate salts of a transition or rare earth metal or combination of transition and/or rare earth metal salts desired for catalytic activity, such as Co nitrate, Fe nitrate, Mn nitrate or, for a hydrogen electrode, Ni nitrate. The porous electrode structure may be infiltrated by any suitable means such as by aerosol spray, dip coating, painting or silk-screening, or vacuum infiltration of the electrocatalyst material into the porous structure. A stack of cells may also be assembled prior to being infiltrated and infiltrated simultaneously.

Following addition of the electrocatalytic precursor, the composite electrode/electrolyte is heated to operating temperature for the electrochemical device of which it is a part, generally about 600 to 900° C., as shown in FIG. 2D. In this way a highly catalytic electrode in a composite electrode/electrolyte structure may be produced without deleterious reactions between the electrocatalytic precursors and the zirconia of the electrolyte at the electrode/electrolyte bonding production stage. Thus, in one example, an LSM/YSZ structure can be fired at reasonably high temperatures (1350° C.) to yield a moderate performance electrode, and by adding cobalt nitrate by infiltration to this electrode the performance is boosted to what might be expected for cobalt based electrode.

Infiltration of a fired electrode with a electrocatalytic precursor solution (e.g., a metal nitrate solution) not only solves the problem of reactivity of the catalytic material with the electrolyte, but also addresses the problem of thermal mismatch. If, for example, a highly catalytic electrode material had a very poor match of the coefficient of thermal expansion with the electrolyte, thermal cycling would typically lead to spallation of the electrode from the electrolyte surface. In the case of the present invention, an electrode material that has a thermal expansion coefficient close to that of the electrolyte may be used. The electrode is therefore well bonded to the electrolyte. In a subsequent step, an electrocatalytic precursor for a highly catalytic material, such as such as a metal oxide, is infiltrated into the bonded electrode thereby improving the electrode performance.

Figure 4:
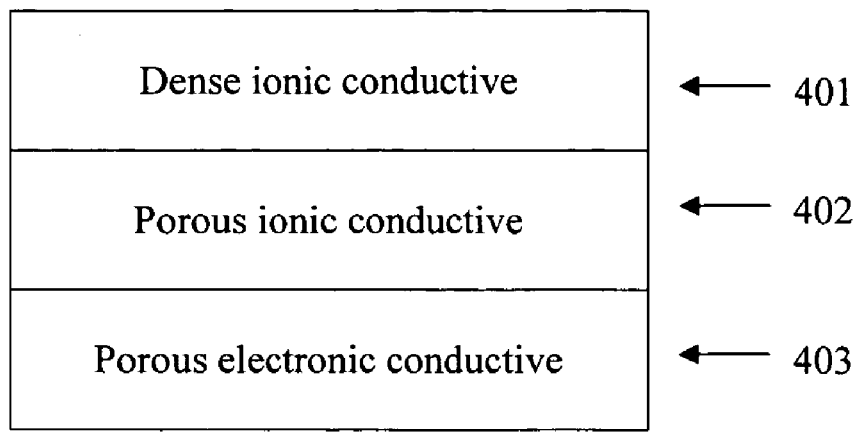
FIG. 4 shows a composite structure in accordance with one embodiment of the present invention.

FIG. 4 represents a not to scale diagram (regarding the thickness of layers) of the different layers in accordance with one embodiment of the invention. A dense ionic conductive layer (401) overlies a porous ionic conductive layer (402) overlies a porous electronic conductive layer (403). In a preferred embodiment, an electrocatalyst is dispersed in the porous ionic conductive layer (402).

Figure 5:
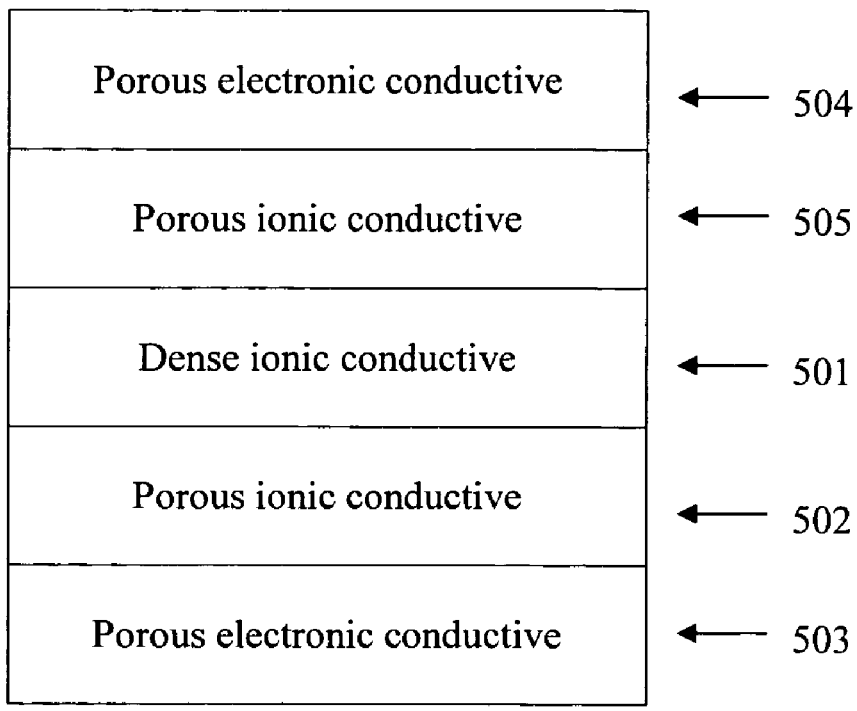
FIG. 5 shows a composite structure in accordance with one embodiment of the present invention.

FIG. 5 represents a not to scale diagram (regarding the thickness of layers) of the different layers in accordance with one embodiment of the invention. A porous electronic conductive layer (504) overlies a porous ionic conductive layer (505), which overlies a dense ionic conductive layer (501) which overlies a porous ionic conductive layer (502) overlies a porous electronic conductive layer (503). In a preferred embodiment, an electrocatalyst is dispersed in the porous ionic conductive layer (502).

Figure 6:
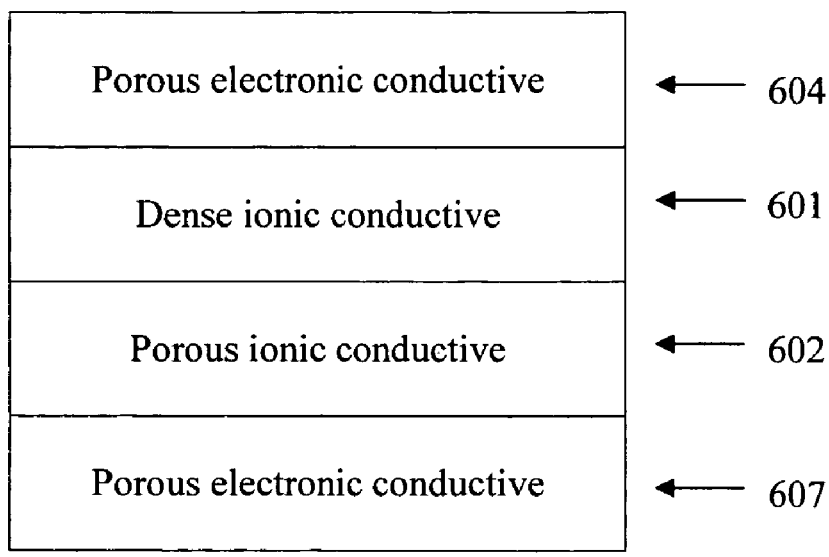
FIG. 6 shows a composite structure in accordance with one embodiment of the present invention.

FIG. 6 represents a not to scale diagram (regarding the thickness of layers) of the different layers in accordance with one embodiment of the invention. A porous electronic conductive layer (604) overlies a dense ionic conductive layer (601) which overlies a porous ionic conductive layer (602) overlies a porous electronic conductive layer (603). In a preferred embodiment, an electrocatalyst is dispersed in the porous ionic conductive layer (602).

Figure 7:
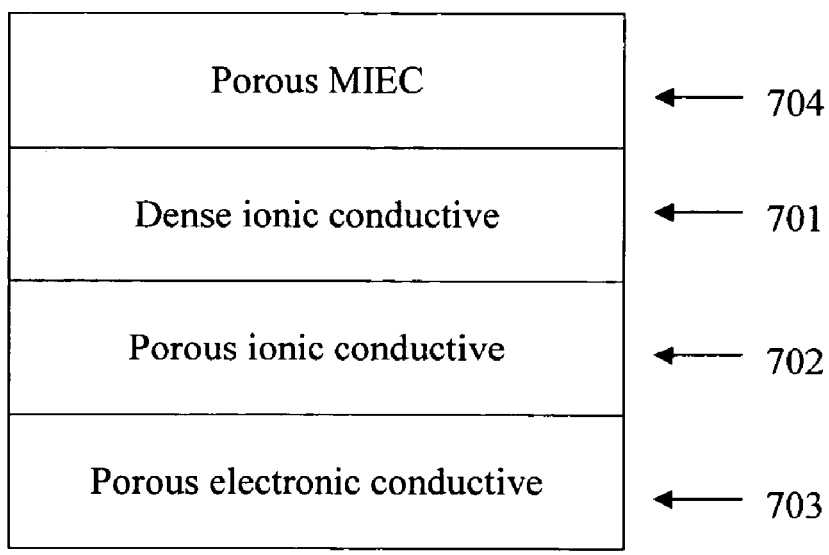
FIG. 7 shows a composite structure in accordance with one embodiment of the present invention.

FIG. 7 represents a not to scale diagram (regarding the thickness of layers) of the different layers in accordance with one embodiment of the invention. A porous mixed ionic/electronic conductive layer (704) overlies a dense ionic conductive layer (701) which overlies a porous ionic conductive layer (702) overlies a porous electronic conductive layer (703). In a preferred embodiment, an electrocatalyst is dispersed in the porous ionic conductive layer (702).

Importantly, this process represents a simple low-cost means of improving electrode performance by allowing the fabrication of a high strength, high conductivity electrode from materials of moderate catalytic activity and then adding that activity in a subsequent step. Furthermore, in the case of expensive catalytic materials, a low cost material can be used to develop the electrode microstructure followed by a small amount of catalytic material introduced by the metal salt technique described herein.

EXAMPLE

The following example illustrates aspects and features of a specific implementation in accordance with the present invention. It should be understood the following is representative only, and that the invention is not limited by the detail set forth in this example.

A composite structure in accordance with one embodiment of the present invention was prepared by the following proceedure. 40 vol % of 325 mesh, 410L stainless steel powder was mixed with 60 vol % polymer (acrylic plus polyethylene glycol (M.W. 6,000)). This was dried at ~100 C to remove water, ground, and pressed into a 38 mm diameter disk approximately 2 mm thick. The disk was immersed in distilled water for 4 hours to remove the polyethylene glycol. The disk was fired to 900 C in an alumina tube furnace under flowing 4% H2/He gas. The resulting disk was strong enough to handle. A paint consisting of polyethylene glycol, acrylic beads (as pore former), and 30 vol % of 8 mol % yttria stabilized zirconia powder (Tosoh Corporation TZ-8Y) was applied such that the resulting layer was approximately 20 micrometers in thickness. A thin yttria stabilized zirconia film (Tosoh Corporation TZ-8Y) was applied via aerosol spray using 3 g of zirconia powder and 0.05 g of dibutyl phthalate ultrasonically dispersed in 100 ml of isopropyl alcohol. The resulting film was approximately 15 micrometers in thickness (determined by weight gain). The resulting structure was then fired to 1300 C for 4 hours in an alumina tube furnace under flowing 4% H2/He gas. The sample was removed and a solution of nickel nitrate+cerium nitrate (approximately equal moles) in distilled water was infiltrated into the porous metal, porous electrolyte, dense electrolyte structure. The sample was oxidized at 700° C. to convert the nitrates to oxides, the infiltration and oxidation was repeated five times, then fractured and observed with a scanning electron microscope. The observation showed a porous metal in contact with the infiltrated $NiO+CeO_2$ dispersed within the pores of the porous electrode layer, in contact with the dense electrolyte.

CONCLUSION

Although the foregoing invention has been described in some detail for purposes of clarity of understanding, those skilled in the art will appreciate that various adaptations and modifications of the just-described preferred embodiments can be configured without departing from the scope and spirit of the invention. Moreover, the described processing distribution and classification engine features of the present invention may be implemented together or independently. Therefore, the described embodiments should be taken as illustrative and not restrictive, and the invention should not be limited to the details given herein but should be defined by the following claims and their full scope of equivalents.

What is claimed is:

1. A composite structure, comprising:
   a porous electronic conductive layer,
   a dense ionic conductive layer,
   a porous ionic conductive layer comprising an electrocatalyst, wherein the porous ionic conductive layer is between and separates the porous electronic conductive layer and the dense ionic conductive layer, and
   an electrode overlying the dense ionic conductive layer, wherein
   the electrocatalyst is in electrical contact with the layer above and below the porous ionic conductive layer.

2. The composite structure as claimed in claim 1, wherein the electrode comprises a porous electronic conductive layer.

3. The composite structure as claimed in claim 1, wherein the electrode comprises a porous ionic conductive layer having a porous electronic conductive layer thereon.

4. The composite structure as claimed in claim 1, wherein the electrode comprises a porous mixed ionic/electronic conductive layer.

5. The composite structure as claimed in claim 1, wherein:
   the porous electronic conductive layer is between 50 and 2000 microns thick, and
   the porous ionic conductive layer is between 1 and 100 microns thick, and
   the dense ionic conductive layer is between 1 and 100 microns thick.

6. The composite structure as claimed in claim 5, wherein:
   the porous electronic conductive layer is between 50 and 2000 microns thick, and
   the porous ionic conductive layer is between 5 and 30 microns thick, and
   the dense ionic conductive layer is between 5 and 30 microns thick.

7. The composite structure as claimed in claim 1, wherein:
   the porous electronic conductive layer consists essentially of an electronic conductor, and;
   the porous ionic conductive layer and the dense ionic conductive layer consists essentially of an ionic conductor material.

8. The composite structure as claimed in claim 1, wherein the porous electronic conductive layer comprises a metal or a metal alloy.

9. The composite structure as claimed in claim 8, wherein the porous electronic conductive layer comprises an alloy selected from the group consisting of a low chromium ferritic steel, an intermediate-chromium ferritic steel, a high-chromium ferritic steel, a chrome-based alloy and a nickel-based Inconel alloy.

10. The composite structure as claimed in claim 8, wherein the porous electronic conductive layer comprises Cr metal.

11. The composite structure as claimed in claim 1, wherein the porous ionic conductive layer comprises a material selected from the group consisting of doped zirconia, doped ceria, scandia stabilized zirconia (SSZ), yttria stabilized zirconia (YSZ), doped lanthanum gallate and doped bismuth oxide.

12. The composite structure as claimed in claim 10, wherein the porous ionically conductive layer comprises YSZ.

13. A solid oxide fuel cell, comprising the composite structure as claimed in claim 1.

14. An oxygen generation device, comprising the composite structure as claimed in claim 1.

* * * * *